Patented July 5, 1927.

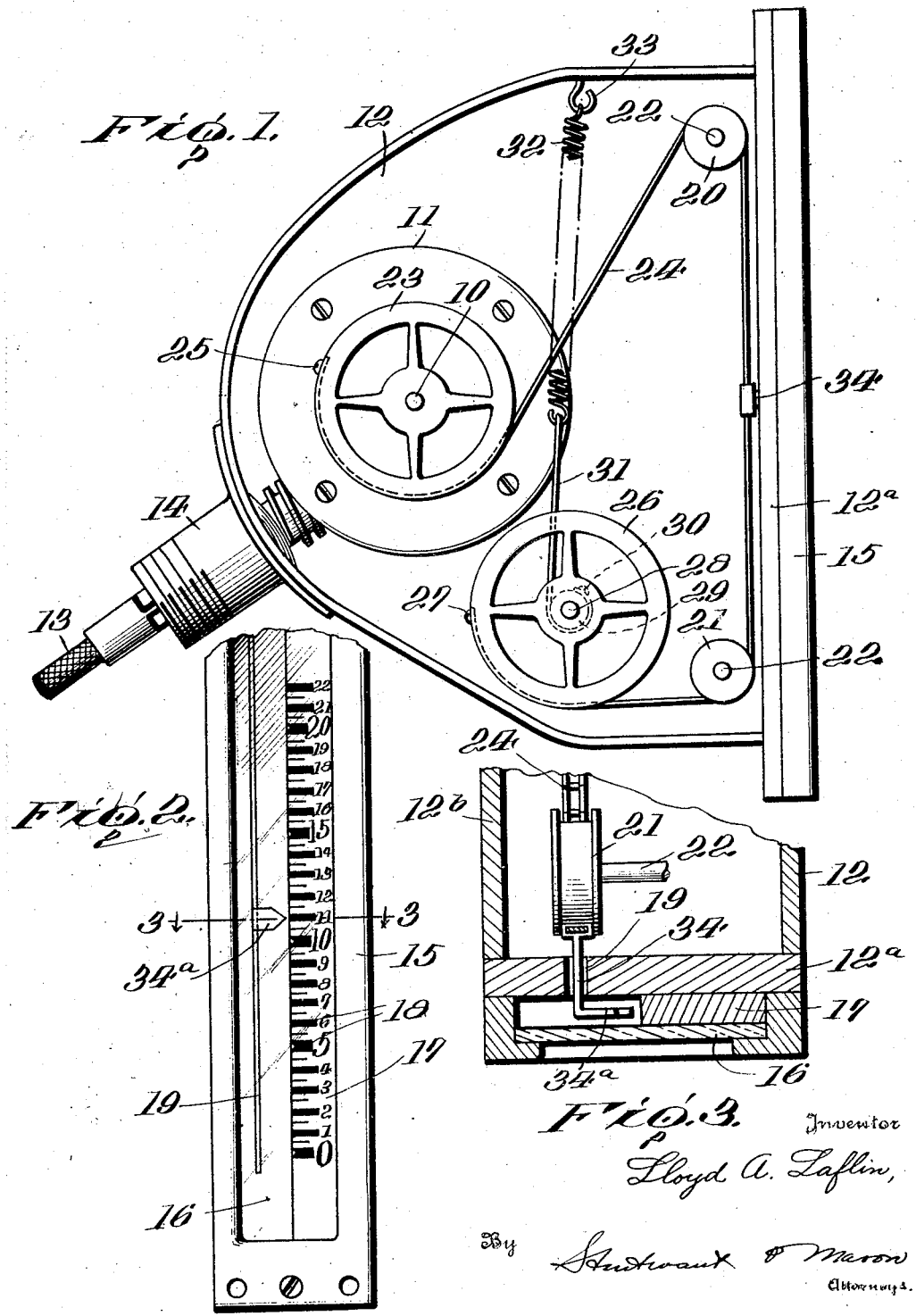

1,634,785

UNITED STATES PATENT OFFICE.

LLOYD ALAN LAFLIN, OF LAKE FOREST, ILLINOIS, ASSIGNOR TO ELGIN NATIONAL WATCH COMPANY, OF CHICAGO, ILLINOIS, A CORPORATION OF ILLINOIS.

MOVEMENT-CONVERTING DEVICE FOR METERS.

Application filed November 11, 1926. Serial No. 147,792.

This invention relates to improvements in movement converting devices and indicators whereby angular movements are converted into rectilinear movements.

Dial meters of the type employing an oscillating shaft and indicating finger are old and well known in many arts. In employing such meters, it is necessary to provide for their reception a panel space at least equal to the area of the face of the instrument, although a large portion of this area is not effectively employed. In a great many employments of such devices, a sufficient area is not available for the reception of the necessary instruments of various types as required for the operation of the particular machine upon which they are located. An instance of this is the instrument board of an airplane, in which it is necessary to employ a great many instruments of various kinds: but when instruments with circular dials, i. e., with oscillating shafts located at right angles to the instrument board, are employed, the instrument board must be made very large to accommodate all the devices: and oftentimes a sufficient space is not available for such a large instrument board.

According to the present invention, a meter of the type employing an oscillating shaft is provided of any known construction, and a device is employed to convert the oscillating quasi-rotational movement of the shaft into a rectilinear movement of an indicating device along a rectilinear scale which is substantially vertical on the ordinary airplane. In this way, the space on the instrument board is conserved, since it is only necessary to provide a space slightly larger than that occupied by an easily read scale.

The number of working parts is reduced to a minimum so that the strain upon the actuating shaft of the tachometer is reduced and the accuracy of the final indication is unimpaired by large torques, which is of great technical advantage as it is necessary in devices of this type to have a moving system of very light elements, so that the torques employed are very small, weight is conserved, and unnecessary strains upon the driving and returning mechanism are avoided. The light weights of the several parts and their arrangement to substantially balance each other permits the device to operate accurately even when the airship is flying upside down.

In particular, according to the present device an angular displacement may be transmitted and converted into a rectilinear displacement: and since with revolution counters of the type for example of Patent 1,447,426 of March 6, 1923, the angular movement of the oscillating shaft varies by equal angles for equal increments or decrements of speed, this movement is transmitted as equal displacements in a rectilinear direction of the indicating finger or index. In this way, the distance of travel of the index is exactly proportionate to the angular movement which would be made by an indicating finger on the shaft itself.

This apparatus has been illustrated on the accompanying drawings by way of example as applied to a tachometer or revolution counter for an airship.

Figure 1 is a side elevation of the casing and dial, with the cover removed.

Fig. 2 is a face view of the dial.

Fig. 3 is a section on line 3—3 of Fig. 2.

It will be understood that this invention is to be applied to a meter or measuring device of any known type: and that only as an illustrative form has it been shown as applied to a tachometer of the type now manufactured under the Prouty et al. Patent No. 1,447,426.

The actuating shaft of this tachometer is represented on the present drawing as the oscillating shaft 10. The casing 11 of this tachometer proper is fixed in an appropriate manner to the casing 12 of the instrument, which has a plane front 12$^a$ parallel to the shaft 10 and with its cover 12$^b$ serves as a protection to prevent the entry of oil and dirt. The mechanism of the tachometer is driven in well known manner by a flexible shaft 13 which enters the casing through the customary bushing 14, and presents its inner end in driving relation with the tachometer mechanism. All of this has been substantially described in the said patent to Prouty et al. No. 1,447,426, and need not be repeated here in greater detail.

The movements of the tachometer shaft 10 from time to time are determined by the prevailing speed of the part to which the flexible shaft 13 is connected, e. g., the main crank shaft of the engine. The movements of the tachometer mechanism cause angular movements of the oscillating shaft 10 by equal increments for equal changes of speed of the engine. If, for example, the engine is turning at 1500 revolutions, the shaft 10 will have departed by fifteen equal angular divisions from its position of rest, and upon an increase of speed to 1700 revolutions per minute, the shaft 10 will move through two further divisions, etc.

Securely fastened to the front 12$^a$ of the casing 12 is a plate 15 having a protective glass 16 therein to guard a scale 17 which is preferably of metal and is divided and lettered at 18 to furnish a reference scale for the reading of the instrument. A slot 19 preferably extends in this first plate 17 for at least the distance from the zero indication to above the maximum speed indication.

The pulleys 20 and 21 are respectively journaled on fixed pins 22 mounted on the casing 12. These pulleys are mounted opposite and in line with the slot 19 on the face 15. Mounted fixedly on the oscillating shaft 10 is a drum 23 which has a flexible member 24 such as a chain or cable fastened at a point 25 of its periphery, so that as the shaft 10 is rotated in a clockwise direction in Fig. 1, the member 24 is wound up thereon; and when the oscillating shaft 10 rotates in the opposite direction, this member is permitted to unwind. The member 24 passes over the pulleys 20 and 21, and on its course between them passes close to and parallel with the slot 19. After leaving the pulley 21, the member 24 passes to a further or take-up drum 26 and is fastened to a point 27 on the periphery thereof. This take-up drum is carried on a journal pin 28 fastened to the casing 12, and has attached to one face a smaller or spring driving drum 29, which in like manner has connected at a point 30 of its periphery a spring connection cable 31 which extends to and is coupled with one end of the helical take-up spring 32, which at its other end is fastened to an eye 33 attached to the casing 12.

Mounted fixedly on the flexible member 24 between the pulleys 20 and 21 is an index finger 34 which projects through the slot 19 and has a pointer 34$^a$ visible from the outside of the face 15 through the glass 16. It is preferred that this pointer 34$^a$ be provided with a radium compound for visibility at night.

In the form shown in Fig. 3, the face member 15 and the glass 16 are shown as enclosing the scale 18 which is mounted upon a metal member 17 which is raised above the general level of the member 12$^a$ whereby to provide a clearance for the pointer 34$^a$.

In operation, as the speed of the engine increases, the flexible shaft 13 causes a corresponding increase in the motion of the tachometer, whereby the actuating shaft 10 is caused to move in a clockwise direction to correspond thereto. During this movement, the drum 23 draws upon the flexible member 24 and winds it up upon its own periphery. The member 24 carries the pointer or index 34$^a$ upward for a distance which corresponds by equal increments to the equal increments of angular movements of the oscillating shaft 10 under the impulse of the tachometer 11. The flexible member 24 during this unwinds from the take-up drum 26 and by the coupling of the latter with the spring drum 29, causes a tensioning of the take-up spring 32.

When the speed of the engine decreases, the actuating shaft 10 moves in a counter-clockwise direction, and releases the tension on the cable 24 for a certain amount of potential slack. This slack is immediately taken up by the take-up spring 32 in an inverse manner to that described above, whereby the pointer or index 34$^a$ moves to its new location.

It is obvious that the drums 23, 26 and 29, as well as the pulleys 20 and 21, may be made very light, and that their pivoting entails no great friction. The flexible member 24 has very little work to perform in moving the pointer 34 since this is guided in the slot 19 with but slight friction. The take-up spring 32 may therefore be very light and weak and in its turn reacts very little in torque upon the actuating shaft 10, whereby the indications are very accurate.

It is obvious that the invention may be applied in any wise apart from the illustrative example shown and more particularly many modifications may be made in the form of execution without departing from the scope of the appended claims.

What is claimed as new is:

1. A movement converting device for indicators having a shaft oscillated by a metering mechanism by equal angular distances for equal increments and decrements of the quantity being measured, a rectilinear graduated scale and an index therefor, an operating drum fixed on said shaft, guide pulleys at the ends of the said scale, a flexible member passing over said pulleys and connected to the said index and connected at one end to said drum, means to maintain the other end of said member under a normal returning tension, whereby said index is moved by equal linear distances along said scale for such equal angular movements of said shaft.

2. A movement converting device for indicators having a shaft oscillated by a metering mechanism by equal angular distances for equal increments and decrements of the quantity being measured, a rectilinear graduated scale and an index therefor, an operating drum fixed on said shaft, guide pulleys at the ends of said scale, a flexible member passing over said pulleys and connected to the said index and connected at one end to the said drum, a take-up drum having a pivot fixed relative to said shaft and connected to the other end of said member, and a spring to exert a torque upon said take-up drum to take up said member during the unwinding movement of said operating drum.

3. In a measuring and indicating instrument having a small horizontal dimension of its parts to permit contiguous mounting of a number of instruments on a board of restricted width, a meter with an oscillated indicating shaft, said meter being of larger diameter and lesser thickness than such dimension, a casing having a front wall with a straight slot therein, said wall being in a plane parallel to the axis of said shaft, a rectilinear scale on said front wall adjacent said slot, an index movable along said slot to cooperate with said scale, and means actuated by said shaft to move said index by equal linear distances for equal angular movements of said shaft, said actuated means including a drum secured to said shaft, a flexible member secured by one end to said drum, and a take-up device connected to the other end of the flexible member to maintain the same under tension, the total width of said scale and slot being substantially that of the thickness of said meter.

In testimony whereof, I affix my signature.

LLOYD ALAN LAFLIN.